A. C. MAXFIELD.
Shaft-Holding Attachments for Carriages.

No. 143,582.  Patented Oct. 14, 1873.

Witnesses:
Frank H. Jordan.
Edwin H. Haskell

Inventor:
Allen C. Maxfield
per atty.
Wm Henry Clifford

UNITED STATES PATENT OFFICE.

ALLEN C. MAXFIELD, OF BIDDEFORD, MAINE.

IMPROVEMENT IN SHAFT-HOLDING ATTACHMENTS FOR CARRIAGES.

Specification forming part of Letters Patent No. 143,582, dated October 14, 1873; application filed August 19, 1873.

*To all whom it may concern:*

Be it known that I, ALLEN C. MAXFIELD, of Biddeford, in the county of York and State of Maine, have invented certain new and useful Improvements in Shaft-Holding Attachments; and I do hereby declare that the following is a full, clear, and exact description thereof, that will enable others skilled in the art to which it appertains to make and use the same, reference being had to the accompanying drawings and to the letters of reference marked thereon which form a part of this specification.

Figure 1:
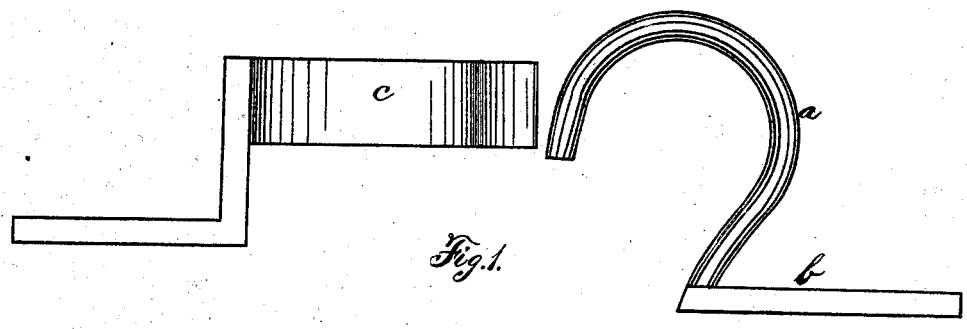
Figure 2:
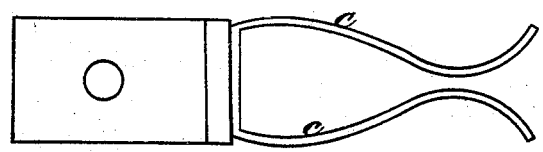

Figure 1 is a side view of the hook and spring. Fig. 2 is a top-plan view of the spring.

Same letters show like parts.

The object of my invention is to produce a simple means whereby the shafts to carriages may be held in an elevated or raised position when not in use. With the outer ends of the shafts lying, as they usually do when not in use, on the ground, their liability to become broken or otherwise injured is far greater than though they were elevated sufficiently to keep them out of the way. My invention consists in attaching to the forward part of the carriage and to the cross-bar of the shafts a spring and hook, to be more fully described hereinafter. By their use they greatly obviate the liability of the shafts becoming broken or injured.

In the drawings, Figs. 1 and 2, will be seen the devices which I employ. They are of the form shown, but can be varied in form and still effect the desired object. *a* shows the hook, which is fastened to the cross-bar of the carriage by a bolt or screw passing down through its horizontal projection *b* and into said cross-bar. A like horizontal projection is seen on the spring *c*, a top plan of which is shown in Fig. 2. This spring is attached to the under side of the forward spring of the carriage by a bolt passing up through the projection, before mentioned, on said spring and through the spring of the carriage. The spring *c* should be so fastened to the carriage as to rest in front or point forward.

It will thus be apparent that with the hook and spring arranged as above described, if the shafts of the carriage are thrown upward, it will force the hook *a* into the spring *c*, and the jaws of said spring will thus hold them in an elevated position until ready for use. When desired to harness a horse to the carriage it obviates all liability of the horse's breaking the shaft by stepping on them, as is often the case, by the reason of their being held aloft, as above described. When desired to disengage the hook from the spring, all that is necessary to do is to reach upward and grasp one of the shafts, when a slight pull downward will accomplish the required purpose.

Instead of the spring *c* being attached to the carriage-spring, it can, if desired, be fastened to the forward part of the carriage itself.

Fig. 1 gives an idea of the relative position of the hook to the spring when fastened to the carriage.

Fig. 2 is on an enlarged scale from that shown in Fig. 1.

What I claim as my invention, and desire to secure by Letters Patent, is—

The combination of the hook *a* and spring *b*, applied to a carriage, as herein set forth, and for the purposes described.

In testimony that I claim the foregoing I have hereunto set my hand this 12th day of August, 1873.

ALLEN C. MAXFIELD.

Witnesses:
 FRANK H. JORDAN,
 EDGAR S. BROWN.